United States Patent Office 3,570,187
Patented Mar. 16, 1971

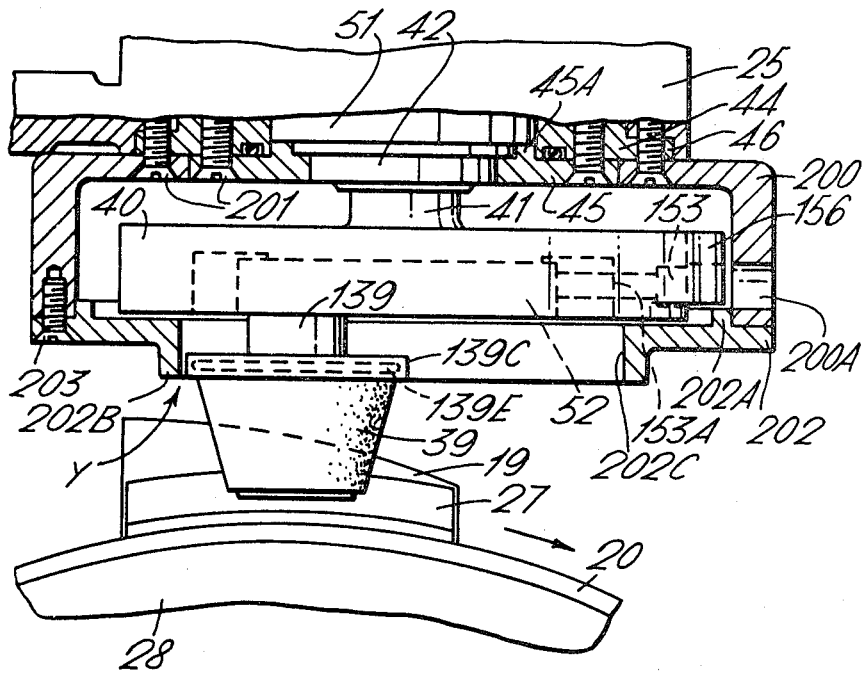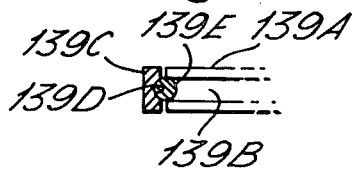

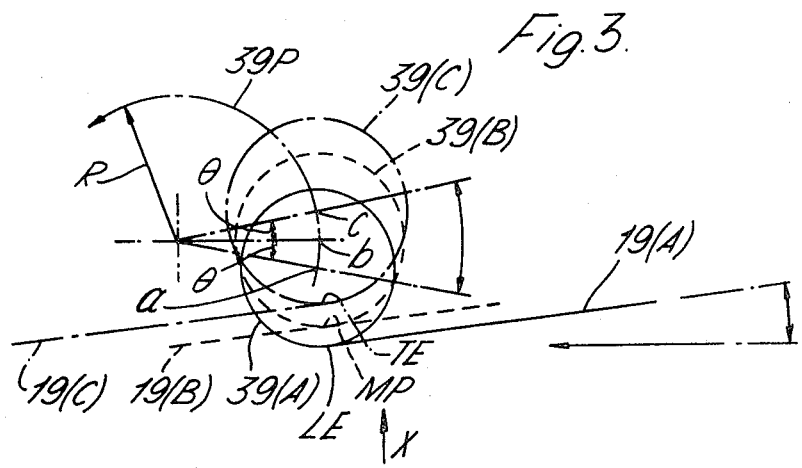
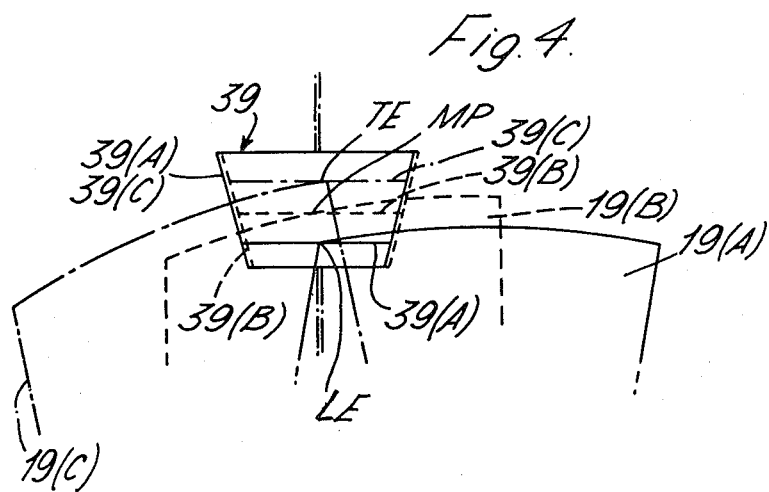

3,570,187
PLANETARY MECHANISMS WITH FRICTIONAL DRIVING MEANS
Edward George Preston and Philip Arthur Maw, London, England, assignors to Molins Machine Company Limited, London, England
Filed Dec. 16, 1968, Ser. No. 784,036
Claims priority, application Great Britain, Dec. 15, 1967, 57,038/67
Int. Cl. B24b 3/00; F16h 1/28
U.S. Cl. 51—90                                  5 Claims

ABSTRACT OF THE DISCLOSURE

A planetary mechanism in which the planet member is rotated by frictional engagement between a stationary annulus and a driving rim carried resiliently by the planet member. Under stationary conditions there is a clearance between the driving rim and the annulus. On rotation, centrifugal force displaces the rim radially relative to the planet member, so taking up the clearance and providing a drive. In the stationary condition there is no side thrust on the planet member. The planet member may be a grinder wheel for a cigarette machine cut-off.

---

This invention concerns improvements in or relating to planetary mechanisms with a frictionally driven planet member.

An example of a planetary mechanism to which the invention may be applied is disclosed in our copending U.S. patent application Ser. No. 783,983, filed Dec. 16, 1968. In that application there is disclosed a cut-off for a continuous rod cigarette-making machine comprising a grinding wheel rotatably mounted on a rotatable arm, so forming, respectively, a planet member and a planet carrier. Rotation of the arm moves the grinder wheel bodily in a circular path, over part of which it is arranged to be moving substantially transversely to the helical knife of the cut-off so as to follow the helical form of the knife during the grinding operation. The present invention may be applied to such a grinder mechanism in order to drive the grinder wheel.

According to the present invention there is provided a planetary mechanism comprising an annulus having an inwardly-facing circular driving surface, a planet carrier, a rotatable planet member carried by the planet carrier, the planet member having a driving rim to rotate it by rolling around the driving surface, the rim being mounted on the planet member by resilient means deformable radially of the planet member, a clearance being provided between the rim and the driving surface when the planet carrier is stationary, which clearance is taken up when the planet carrier is rotating by the rim being centrifugally displaced against the action of the resilient means and towards the driving surface.

The resilient means may be a rubber ring which is trapped between an annular groove on the inside of the rim and an annular groove on the outside of the planet member.

The provision of the clearance ensures that there is no side thrust on the planet member and the planet carrier, and thus on their bearings, when the planet carrier is stationary. This side thrust could become excessive when the planet carrier is in certain positions if the driving surface is not perfectly circular or if it is eccentric relative to the axis of rotation of the planet carrier. The provision of the resilient means allows this clearance to be taken up and also allows the driving rim to move relative to the planet member to take up any non-circularity or eccentricity of the driving surface.

One embodiment of the present invention will now be described, by way of example, with reference to the accompanying drawings, of which:

FIG. 1 is a side elevation of part of a grinder mechanism for the helical knife of a cut-off for a continuous rod cigarette-making machine, which incorporates the invention, FIG. 2 is a sectional view of the driving rim and the resilient means associated with the grinder wheel, FIG. 3 is a diagrammatic plan view of the grinder and the knife illustrating the grinding action, and FIG. 4 is a side view of the grinder and the knife taken in the direction of the arrow X in FIG. 3 similarly illustrating the grinding action.

The invention is applied to a grinder mechanism for a cut-off for a continuous rod cigarette-making machine. The cut-off and the grinder mechanism are fully disclosed in the aforementioned application, the same numerals for parts disclosed in that application being used here. The cut-off comprises a helical knife 19 which is clamped between two clamping plates 27 mounted within a rotatable drum 20. The clamping plates 27 protrude through a slot in the drum 20 and the manner of mounting them in the drum cannot be seen as the drum is closed by a plate 28. The cigarette rod (not shown) is arranged at the helix angle relative to the rotational axis of the drum so that on each revolution of the drum the cigarette rod is cut through at right angles to produce a cigarette.

The knife is ground on each revolution of the drum. One side of the cutting edge of the knife 19, i.e. the opposite side to that shown in FIG. 1, is ground by a frusto-conical grinder wheel (not shown) driven about a stationary axis. The other side of the cutting edge is ground by a frusto-conical grinder wheel 39.

The grinder wheel 39 is rotatably mounted towards one end of a planet carrier in the form of an arm 40. The grinder wheel 39 is thus a planet member. The grinder wheel is rotatably mounted in a block 52 which is within, and is slidable along, the arm 40. The position of the block 52 along the arm 40 is adjustable by means of a screw 153A which has a head 153. The screw 153A is threaded into the block 52 and is axially restrained in the block 52. Rotation of the screw 153A thus moves the block 52 along the arm 40. The block is clamped in place by means (not shown). A balance weight 156 is provided at the opposite end of the arm 40.

The arm 40 is secured to the lower end of a rotatable shaft 41 which is journalled towards its lower end in a plain bearing 42. The bearing 42 is mounted in an annular plate 45 which is secured to an outwardly flanged insert 44 which in turn is received in a stepped aperture 46 in a housing 25. The plate 45 has an annular rib 45A which traps between itself and a flange (not shown) on the insert 44 another bearing 51 which supports the lower end of another shaft (not shown). This other shaft surrounds the shaft 41 and drives it through an internal key and keyway (not shown).

A drum 200 has a circular aperture to receive the plate 45, and the plate 45 and the drum 200 are secured to the insert 44 and the housing 25 by countersunk screws 201. The cylindrical portion of the drum 200 extends downwardly to just below the arm 40 and is provided with a radial hole 200A to give access to the screw head 153.

The lower and open end of the drum 200 is partially closed by an annulus 202 which has an annular rib 202A which fits inside the drum 200. The annulus 202 is secured to the drum 200 by countersunk screws 203 (one only of which is shown). At its inner edge the annulus has a cylindrical flange 202B, and the radially inner surface of the annulus and the flange present an inwardly-facing cylindrical driving surface 202C which is coaxial with the rotational axis of the shaft 41. The driving surface will be referred to later.

As disclosed in the aforementioned application, the shaft 41 and thus the arm 40 are rotated at the same rotational speed as that of the drum 20 and so that the grinder wheel 39 is moved bodily along a circular path so that whilst the knife is passing the grinder wheel 39 the latter is moving transversely to the knife i.e. upwards from the plane of FIG. 1. The radius of this path is chosen so that the grinder remains in grinding contact with the knife edge to grind a chamfer thereon.

The action of the grinder is shown diagrammatically in FIGS. 3 and 4.

FIG. 3 is a developed plan view (so that the knife 19 is shown as a straight line) and shows the knife and the grinder 39 in three successive positions. The path of the rotational axis of the grinder 39 is a circle, part of which is shown at 39P. The positions of the rotational axis at the positions (A) (B) and (C) are shown at a, b and c respectively. The first position is with the leading end LE of the knife 19 just beginning to contact the grinder wheel 39; the knife is shown at 19(A) and the grinder is shown at 39(A), both being shown in solid lines. The second position is with the mid-point of the knife in contact with the grinder, as shown at MP, the knife and the grinder being shown in dotted lines at 19(B) and 39(B) respectively. The first position is with the leading end TE of the knife in contact with the grinder, the knife and grinder being shown at 19(C) and 39(C) respectively in dot and dash line. Due to the progressively increasing height of the knife edge successive points along it come into contact with the grinder at progressively increasing diameters of the grinder. Thus, the circles 39(A), 39(B) and 39(C) which represent the grinder in FIG. 3 are of increasing sizes. Corresponding lines 39(A), 39(B) and 39(C) are shown on the grinder wheel 39 in FIG. 4 and represent the successive points around the grinder which contact the leading end, midpoint, and trailing end, respectively, of the knife. It will be appreciated that a different diameter on the grinder wheel 39 corresponds to each point along the knife edge.

It will be appreciated that the bodily arcuate movement of the grinder 39 from position 39(A) to 39(B) which occurs whilst the arm 40 moves through an angle θ as shown in FIG. 3, not only gives the grinder wheel 39 a motion transverse to the knife 19 substantially the same as the displacement in the direction of the axis of rotation of the point MP relative to the point LE on the knife, but also moves the grinder slightly to the right as viewed in these figures. Thus, in FIG. 4 the grinder wheel is shown in solid line at 39(A) and is shown in dotted line at 39(B). From position 39(B) to position 39(C) as the arm 40 rotates through a further angle θ the grinder 39 moves back a corresponding amount to the left. The grinder 39 is not shown in dot and dash line in position 39(C) in FIG. 4 because this position coincides with the position 39(A) shown in full line.

As the knife moves from position 19(A) to position 19(C) the grinder has to be given a transverse motion somewhat greater than that dictated purely by the helix angle of the knife due to the fact that successive points along the knife contact the grinder at progressively increasing radii thereon. The grinder therefore when moving through angle θ has to be given an additional transverse motion equal to the difference between the radius of the grinder wheel 39 at the point of contact with the leading end LE of the knife as shown at 39(A) and that at the point of contact with the midpoint LP of the knife as shown at 39(B). This is achieved by choosing a suitable radius R (FIG. 3) of the path of the grinder.

As has been mentioned, the rotational speed of the arm 40 is the same as that of the drum 20 and the knife 19 so that as the knife 19 moves through 360°−2θ from position 19(C) to 19(A) the grinder 39 and the balance weight 156 pass over the drum 20.

The grinder wheel 39 is frictionally driven from the driving surface 202C of the annulus 202. Mounted on the spindle 139 of the grinder wheel 39, and thus also forming part of the planet member, is a disc 139A which has an annular groove 139B (FIG. 2). Surrounding the periphery of the disc 139A is a driving rim 139C of case-hardened steel which has an internal annular groove 139D. The outer radius of the driving rim 139C is greater than the maximum radius of the grinder wheel 39. The drum 139C is mounted on the disc 139A by resilient means deformable radially of the grinder wheel 39. This resilient means is a soft rubber O-ring 139E which is trapped between the two annular grooves 139B and 139D.

The position of the block 52 along the arm 40 is adjusted so that there is a small clearance as indicated at Y between the driving rim 139C and the cylindrical driving track 202C. When the cut-off mechanism is running at operating speed the speed of rotation of the arm 40 is such that the driving rim 139C is centrifugally displaced into contact with the driving surface 202C. This occurs due to the soft rubber ring 139E being compressed by the part of the driving rim 139C which is at any instant furthest away from the driving surface 202C. Thus the effective-rolling radius of the driving rim increases sufficiently to take up the clearance at Y.

This arrangement avoids excessive side thrust on the grinder wheel 39 and the arm 40 and on their bearings when the arm 40 is stationary. Such excessive side thrust could occur at certain positions of the arm 40 due to eccentricity or non-circularity of the driving surface 202C if the driving rim were to be rigidly secured to the grinder wheel spindle.

The clearance is chosen to be small so that the driving rim will be positively rotated by the driving surface at operating speeds, but so that no contact occurs between the driving rim 139C and any part of the driving surface when the cut-off is not operating, or is just starting to rotate. Thus the mass of the driving rim 139C and the softness of the rubber ring 139E are chosen for this to happen over the range of operational speeds of the cut-off and over the operational range within which the block 52 may be adjusted along the arm 40.

In the above-mentioned application the various adjustments that may be made in order to cut off different cigarette lengths are described. Only two of these adjustments are relevant to the present invention. One is that the shaft 41, and thus the arm 40 and the grinder wheel 39, are adjustable up and down, and to cater for this the driving surface 202C is cylindrical. The other adjustment is alteration of the radius of the circular path along which the grinder wheel 39 travels bodily produced by adjustment of the block 52 along the arm 40. To cater for this latter adjustment the annulus 202 is replaced by another similar annulus with a driving surface 202C of suitable radius to provide the desired clearance at Y. Each of these annulii 202 will cater for a small range of adjustment of the block 52 and thus for a small range of cigarette lengths. The size of this range is determined by the amount that the static clearance at Y can be varied. Thus, a sufficiently large number of annulii 202, each with a driving surface of different radius, may be provided so that the total range of cigarette length that the cut-off can produce is catered for. Alternatively, it may be more convenient to use any particular annulus 202 only for one specific cigarette length.

What we claim as our invention and desire to secure by Letters Patent is:

1. A planetary mechanism comprising an annulus having an inwardly-facing circular driving surface, a planet carrier, a rotatable planet member carried by the planet carrier, the planet member having a driving rim to rotate it by rolling around the driving surface, the rim being mounted on the planet member by resilient means deformable radially of the planet member, a clearance being provided between the rim and the driving surface when the planet carrier is stationary, which clearance is taken up when the planet carrier is rotating by the rim being centrifugally displaced against the action of the resilient means and towards the driving surface.

2. A planetary mechanism as claimed in claim 1 wherein the resilient means is a rubber ring, said mechanism further comprising an annular groove on the inside of the rim and an annular groove on the outside of the planet member between which said rubber ring is confined.

3. A planetary mechanism as claimed in claim 1 wherein the planet member comprises a grinding wheel of a cutoff mechanism.

4. A planetary mechanism as claimed in claim 1 further comprising adjustment means for moving said planet member relative to said annulus whereby the clearance between the rim and the driving surface may be regulated.

5. A planetary mechanism as claimed in claim 2 wherein the planet member comprises a grinding wheel.

References Cited
UNITED STATES PATENTS 3,205,622   9/1965   Leveque _____ 51—120

LESTER M. SWINGLE, Primary Examiner

U.S. Cl. X.R.

74—660